(12) United States Patent
Uchiyama et al.

(10) Patent No.: US 6,400,362 B1
(45) Date of Patent: Jun. 4, 2002

(54) IMAGE PROCESSING METHOD AND APPARATUS

(75) Inventors: Shinji Uchiyama, Yokohama; Akihiro Katayama, Yokosuka; Atsushi Kumagai, Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/038,686

(22) Filed: Mar. 9, 1998

(30) Foreign Application Priority Data

Mar. 10, 1997 (JP) .............................................. 9-054789

(51) Int. Cl.[7] .............................................. G06T 11/00
(52) U.S. Cl. ........................ 345/420; 345/426; 345/423; 345/629; 345/632; 345/427
(58) Field of Search ................................ 345/419, 425, 345/426, 427, 433, 423, 435, 629, 632, 420

(56) References Cited

U.S. PATENT DOCUMENTS

| | | | | |
|---|---|---|---|---|
| 5,261,041 A | * | 11/1993 | Susman | 345/419 |
| 5,379,371 A | * | 1/1995 | Usami et al. | 345/428 |
| 5,894,310 A | * | 4/1999 | Arsenault et al. | 345/433 |
| 6,151,028 A | * | 11/2000 | Kumagai et al. | 345/427 |

* cited by examiner

*Primary Examiner*—Mark Zimmerman
*Assistant Examiner*—Kimbinh T. Nguyen
(74) *Attorney, Agent, or Firm*—Fitzpatrick, Cella, Harper & Scinto

(57) ABSTRACT

A virtual space including a plurality of different data is generated on the basis of a tree structure including, as construction elements, shape data, light space data, and the like, change processing such as addition, deletion, replacement, and the like of the construction element is done for the tree structure as a basis of the generated virtual environment, and the virtual environment is regenerated. The change processing can be done more efficiently for the virtual environment made up of various kinds of data.

18 Claims, 17 Drawing Sheets

IMAGE PROCESSING METHOD AND APPARATUS

BACKGROUND OF THE INVENTION

1. Field of the Invention

The present invention relates to an image processing method and apparatus for generating and displaying a virtual environment for virtual reality.

2. Related Background Art

As one of conventional techniques of expressing three-dimensional objects or spaces and presenting observation images from arbitrary positions and directions, the following method is known:

(1) Three-dimensional objects or spaces are reconstructed by expressing three-dimensional objects or spaces using shape model data such as polygon data, curved surface data, and the like, texture data representing their surface attributes and patterns, light source data, and the like, and drawing the space images viewed from arbitrary positions and directions by computer graphics rendering techniques.

Upon building a three-dimensional virtual environment with this method, a method of expressing elements (coordinate transformation data, shape data, surface attribute data, illumination, and the like) that construct the virtual images using a tree structure is known. This is because a space, ground, building, room, furniture, illuminator, ornament, and the like that construct a three-dimensional space originally have a hierarchically nesting relationship among them. For example, an ornament on a table depends on the layout of the table so that it moves together with the layout of the table, and it is often convenient to arrange such ornament relative to the coordinate system of the table. For this reason, a data structure which has hierarchical dependence on the layout is used. As an example of this method, the virtual environment is expressed by an n-ary tree structure.

For example, FIG. 4 shows an image of an example of a simple virtual environment. In case of FIG. 4, paying attention to a room, table, and sofa, the room is described on a coordinate system $C_2$, which is transformed from a world coordinate system $C_0$ by a coordinate transformation $T_2$, and the table and sofa in that room are respectively described on coordinate systems $C_3$ and $C_4$ which are transformed from the coordinate system $C_2$ by coordinate transformations $T_3$ and $T_4$. The pot on the table is described on a coordinate system $C_5$ which is transformed from the coordinate system $C_3$ by a coordinate transformation $T_5$. Furthermore, light space data is set on the table. This data is described on a coordinate system $C_6$ which is transformed from the coordinate system $C_3$ by a coordinate transformation $T_6$ as in the pot. When this environment is expressed by a schematic tree structure, a tree shown in FIG. 5 is obtained.

By changing the tree structure by adding or deleting construction elements of the tree with this tree structure, or replacing the elements with other ones, objects, spaces, and the like in the virtual environment can be added, deleted, or replaced.

(2) A method of reconstructing three-dimensional objects or spaces by generating light space data on the basis of a group of images obtained by actually sensing three-dimensional objects or spaces, and generating and displaying images that can be seen from arbitrary positions and directions on the basis of the light space data is known.

With this method, each object is reconstructed as a set of light rays coming from the object without calculating its shape.

However, conventional methods (1) and (2) suffer the following problems.

It is hard for conventional method (1) to generate or reconstruct shape data of an object with a very complicated shape. Also, it is hard to acquire shape data of an object with a complicated shape from a real object using a three-dimensional measurement device. Especially, it is more difficult to reconstruct an image of a real object having an existing complicated shape or complicated surface pattern or reflection characteristics (absorption/transmission characteristics). Furthermore, in general, an artificial object is relatively easily expressed, but a natural object is hard to express. However, the merit of this method is to be able to express an artificial, simple three-dimensional space such as a room, a row of houses and stores on a street, or the like mainly constructed by planes with a small data volume. In addition, the method of expressing a virtual environment using a tree structure is an excellent one.

In conventional method (2), after light space data is generated from a predetermined number of sensed images, an observation image can be generated from any arbitrary view point position (there are, in fact, some constraints to be exact). Since this method does not reconstruct any object shape but describes an object on the basis of sensed images of the object itself, it is an excellent description technique that can express an object with high reality. However, a large data volume is required, and image sensing is difficult to attain when the object is in a broad range. This technique is rather suitable for describing a three-dimensional object, but is not suitable for expressing a broad three-dimensional space such as a room, a row of houses and stores on a street, and the like.

Furthermore, conventional methods (1) and (2) are fundamentally different techniques, and no method that can combine these methods while effectively utilizing their characteristics and merits alone is available.

SUMMARY OF THE INVENTION

It is an object of the present invention to provide an image processing method and apparatus which can more efficiently change a virtual environment constructed by various kinds of data.

In order to achieve the above object, according to the present invention, there is provided an image processing method of generating and displaying a virtual environment, comprising:

the tree structure generation step of generating a tree structure which includes, as construction elements, shape data that geometrically describes a three-dimensional object and three-dimensional space, and light space data that describes a three-dimensional object and three-dimensional space on the basis of a sensed image;

the virtual environment generation step of generating a virtual environment including both the shape data and light space data on the basis of the tree structure generated in the tree structure generation step;

the instruction step of instructing desired processing for a construction element of the tree structure as a basis of the virtual environment generated in the virtual environment generation step;

the change step of changing the tree structure by the processing for the construction element instructed in the instruction step; and the regeneration step of regenerating the virtual environment on the basis of change contents in the change step.

Also, in order to achieve the above object, according to the present invention, there is provided an image processing apparatus for generating and displaying a virtual environment, comprising:

tree structure generation means for generating a tree structure which includes, as construction elements, shape data that geometrically describes a three-dimensional object and three-dimensional space, and light space data that describes a three-dimensional object and three-dimensional space on the basis of a sensed image;

virtual environment generation means for generating a virtual environment including both the shape data and light space data on the basis of the tree structure generated by the tree structure generation means;

instruction means for instructing desired processing for a construction element of the tree structure as a basis of the virtual environment generated by the virtual environment generation means;

change means for changing the tree structure by the processing for the construction element instructed by the instruction means; and regeneration means for regenerating the virtual environment on the basis of change contents by the change means.

DETAILED DESCRIPTION OF THE PREFERRED EMBODIMENTS (a) First Embodiment

Figure 1:
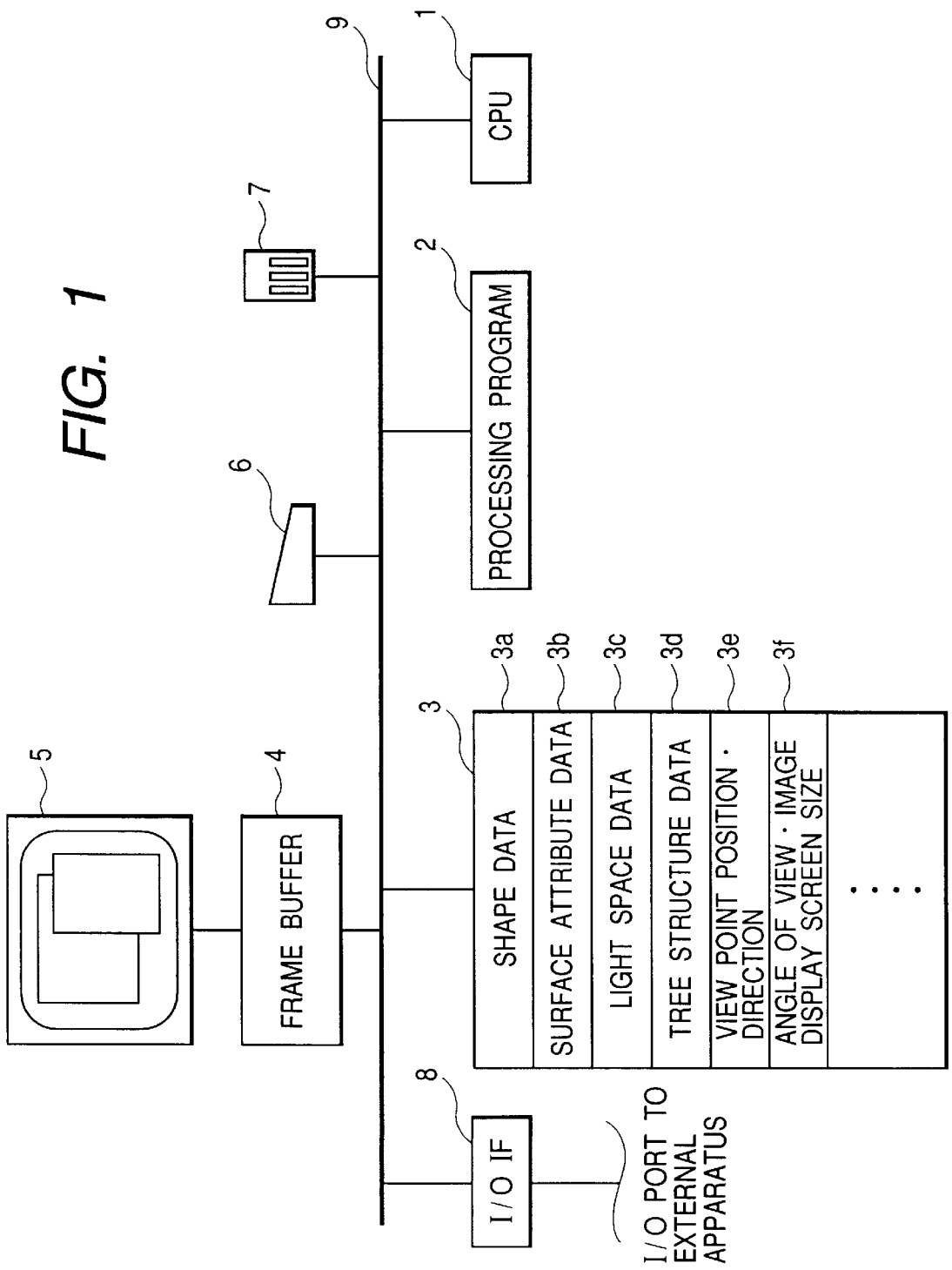
FIG. 1 is a block diagram according to the first embodiment of the present invention.

FIG. 1 is a block diagram showing connections among respective units of an image processing apparatus according to the first embodiment. A CPU 1 executes the processing sequence of the first embodiment. A processing sequence storage device 2 stores a processing sequence. The processing sequence may be pre-stored in the processing sequence storage device 2. Alternatively, a processing sequence stored in a storage medium such as an FD, CD-ROM, ROM, magnetic tape, or the like may be supplied via an external apparatus interface 8 (to be described later).

A data storage device 3 holds data generated or input before, after, and during processing. The data storage device 3 stores data such as shape data 3a, surface attribute data 3b, light space data 3c, tree structure data 3d, view point position and direction 3e, angle of view and image display screen size 3f, and the like.

A frame buffer 4 temporarily stores an image to be supplied to a display device (window system) 5 so as to present the intermediate and final processing results. The window system 5 serves as a display device for displaying an image stored in the frame buffer 4. A keyboard 6 is used for inputting characters and instructions during processing. A mouse 7 is used for designating desired position on the display screen. The external apparatus interface 8 is used for inputting/outputting data, processing sequence, and the like. A bus 9 interconnects the above-mentioned units.

Figure 2:
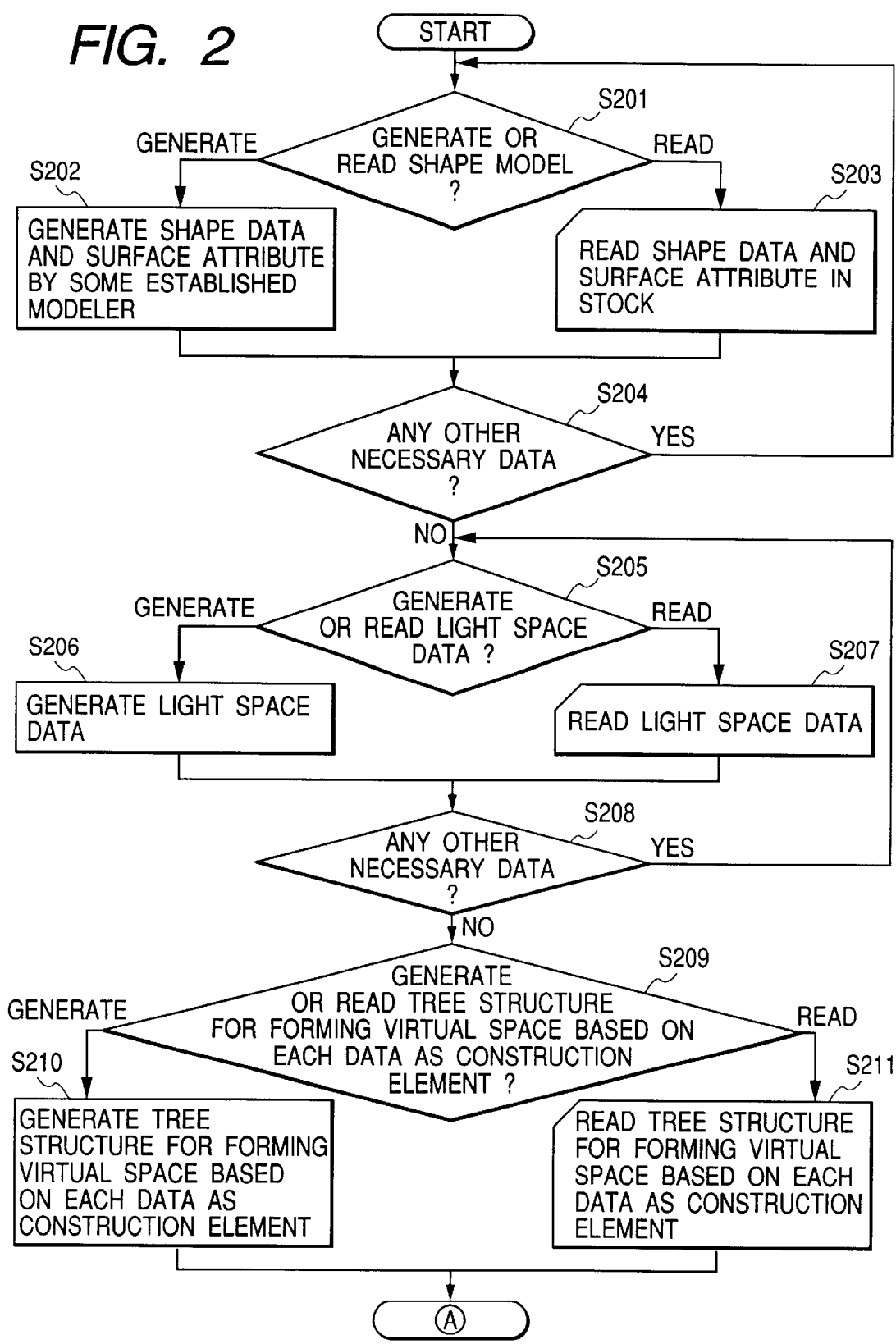
FIG. 2 is a flow chart showing the first half processing of the first embodiment.

FIG. 2 is a flow chart showing the processing flow of the first embodiment, and the first embodiment will be explained in detail below with reference to FIG. 2. In order to generate a virtual environment using geometrical shape models, internal objects, architecture, background, and the like that construct the virtual environment must be formed using a modeler device that can form geometrical shape data and surface attribute data of some computer graphics.

This generation processing can use an established technique, and it is selected in step S201 whether shape data 3a as geometrical shape models and surface attribute data 3b are generated during this processing or data generated by another processing are read. If the shape data 3a and surface attribute data 3b are generated during this processing, they are generated in step S202; otherwise, data generated by another generation device are read. The shape data includes polygon data such as a triangular patch, and the like, and free curved surface data such as NURBS, and the like. The surface attribute data represents the material, reflection characteristics, pattern, and the like of the shape, and the pattern is input as texture data. The texture data represents the pattern of the surface of polygon data, free curved surface data, and the like, and includes the pattern image data, and data that describes the positional relationship between that image and the object on which the image is to be pasted.

The flow then advances to step S204. In this embodiment, a plurality of different data that express objects, spaces, and the like that construct a virtual environment may be used. In step S204, it is checked if there are other data to be generated or read. If there are other data to be generated or read, the flow returns to step S201; otherwise, the flow advances to step S205.

In step S205, it is selected whether light space data 3c to be set in the virtual environment is generated or light space data 3c generated in advance is read. If the data 3c is generated, it is generated in step S206; otherwise, the data is read in step S207.

A method of generating the light space data 3c in step S206 will be described below.

Figure 12A:
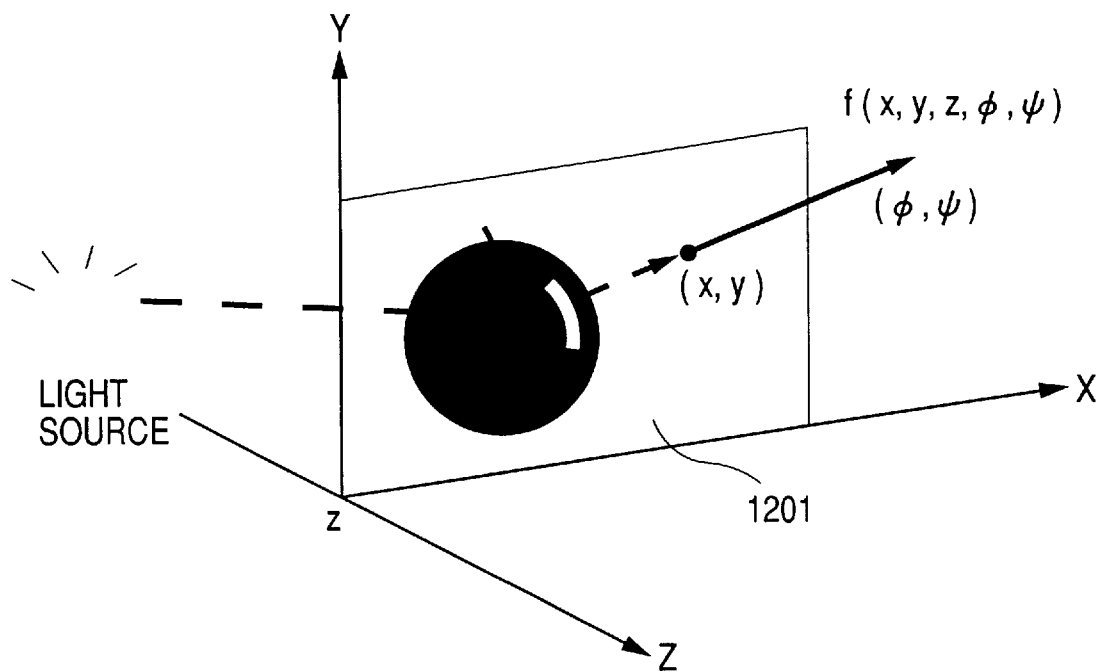
FIGS. 12A and 12B are views of a three-dimensional space for explaining the principle of a light space.
Figure 12B:
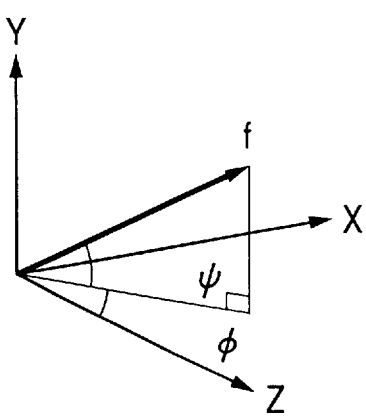
Figure 13:
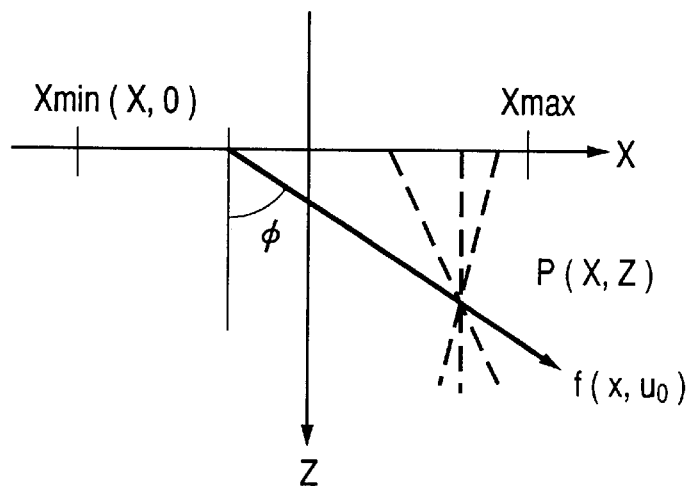
FIG. 13 is a view showing the relationship between a certain point and light that passes through the point in a real space.
Figure 14:
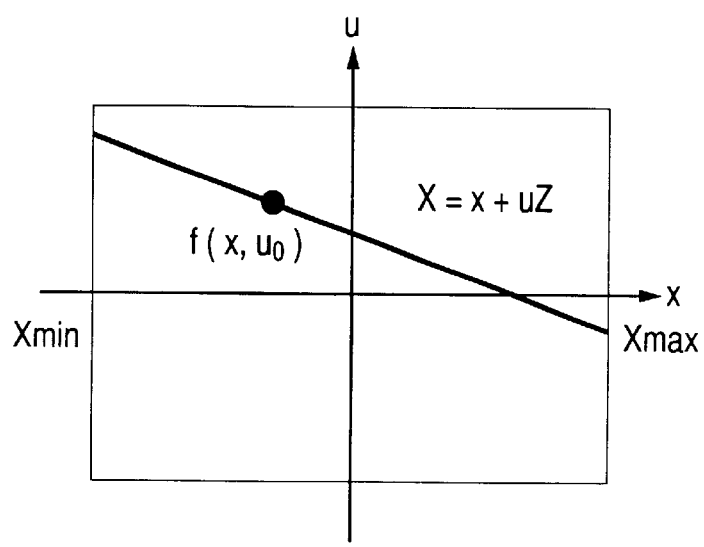
FIG. 14 is a view for explaining mapping of light that passes through a certain point in a real space to an x-u space as a light space.

A method of assuming a plane of z=0 on a coordinate system shown in FIGS. 12A and 12B and expressing a three-dimensional space as a set of light rays that pass through the plane (to be referred to as a reference plane 1201 hereinafter) (three-dimensional space expression by light space) has been proposed. In this method, an image that can be observed at a view point position P within a range of z>0 in the three-dimensional space is equivalent to an image obtained by sampling only light rays that pass through P from a set of light rays that pass through the reference plane 1201 (see FIG. 13). In general, each light ray is expressed by a position (x, y) the light ray passes through the reference plane 1201, angles φ and φ the light ray makes with x- and y-axes, time t the light ray has passed through the plane, and color (r, g, b) of the light ray. However, in practice, since the calculation amount and data volume become huge, the object is often assumed to be a still object having no parallax in the y-direction. Under this assumption, u=tan φ is set to project each light ray onto an x-u space, and when the light space is processed in the projected x-u space, a light ray that passes through a certain point P forms a linear path, as shown in FIG. 14. This path is given by:

$$x = X - Z \cdot u \quad (1)$$

$$u = \tan \phi \quad (2)$$

where (X, Z) is the observation view point position, and x is the position the light ray crosses the x-axis on the x-u space. Also, φ is the angle the light ray makes with the z-axis.

Figure 15A:
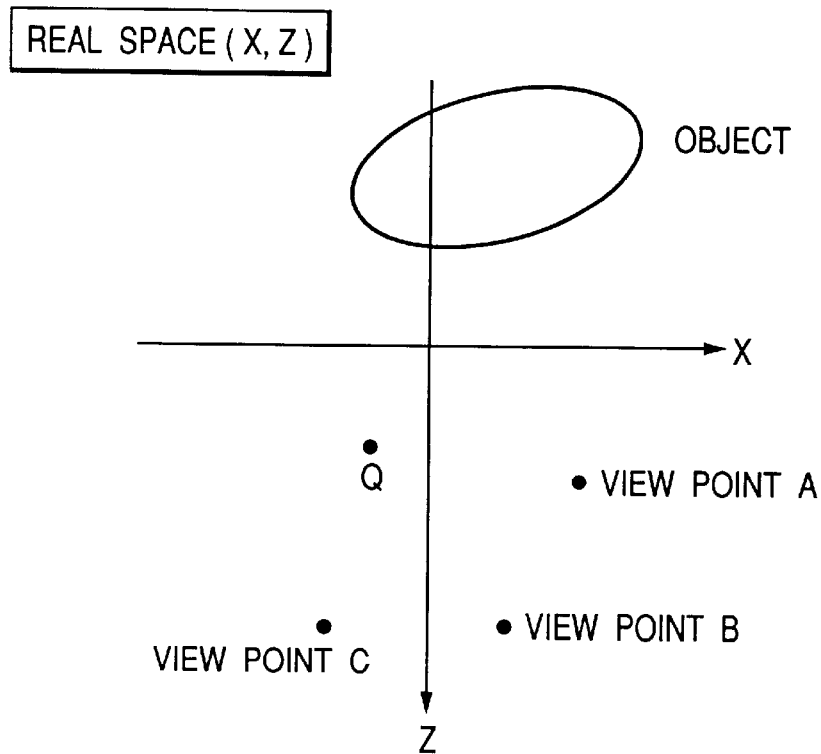
FIGS. 15A and 15B are views showing the principle of two-way transformations between the real space and light space.
Figure 15B:
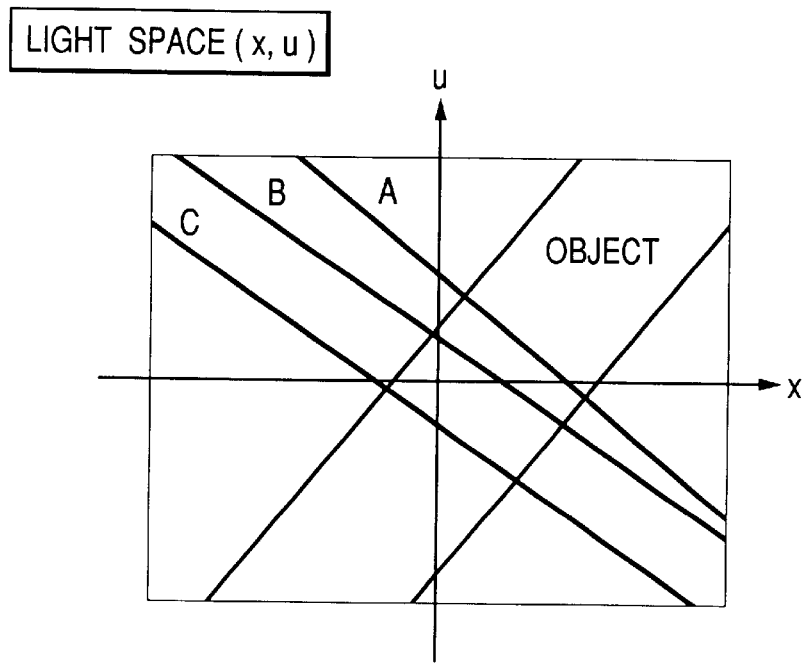

Assume that linear paths are obtained from images obtained at a large number of view point positions, and the x-u space is densely filled with these paths, as shown in FIGS. 15A and 15B. At this time, an image at a view point position Q within a range of z>0 can be obtained by calculating a path that passes through Q on the x-u space and obtaining the colors of light rays already recorded on that path, as shown in FIGS. 15A and 15B. Generation of light space data in step S206 corresponds to mapping of multi-view point image data onto the x-u space in the above-mentioned processing.

In this manner, the light space data is acquired by generating light space data in step S206 or reading light space data generated separately in step S207. A plurality of different light space data may be present as in steps S201 to S204 described above. Hence, it is checked in step S208 if there are other light space data to be generated or read. If there are other light space data to be generated or read, the flow returns to step S205; otherwise, the flow advances to step S209.

In step S209 and the subsequent steps, the data acquired so far are combined and arranged to build a three-dimensional world constructed by three-dimensional spaces and objects. The three-dimensional world built becomes a virtual environment.

Upon building the virtual environment by combining these data, the method of expressing elements (coordinate transformation data, shape data, surface attribute data, illumination, and the like) that construct the virtual environment using a tree structure is used as in conventional method (1). This is because a space, ground, building, room, furniture, illuminator, ornament, and the like that construct a three-dimensional space originally have a hierarchically nesting relationship among them. For example, an ornament on a table depends on the layout of the table so that it moves together with the layout of the table, and it is often convenient to arrange such ornament relative to the coordinate system of the table. For this reason, a data structure which has hierarchical dependence on the layout is used.

It is checked in step S209 whether a tree structure that forms a virtual environment is generated or read. If it is determined that a tree structure is generated, the respective data acquired by the processing in steps S201 to S208 are combined to generate a hierarchical tree structure in step S210. The respective data indicate each type of shape data 3a, surface attribute data 3b, and light space data 3c, and a plurality of data may be included in each type. It is determined in step S209 that the tree structure is read when a hierarchical tree structure formed by the respective data acquired by the processing in steps S201 to S208 is already present, and that tree structure data is read in step S211.

In either case of generating the data in step S210 or reading the data in step S211, the tree structure of the construction elements of the virtual environment is expressed by an n-ary tree structure.

Figure 6:
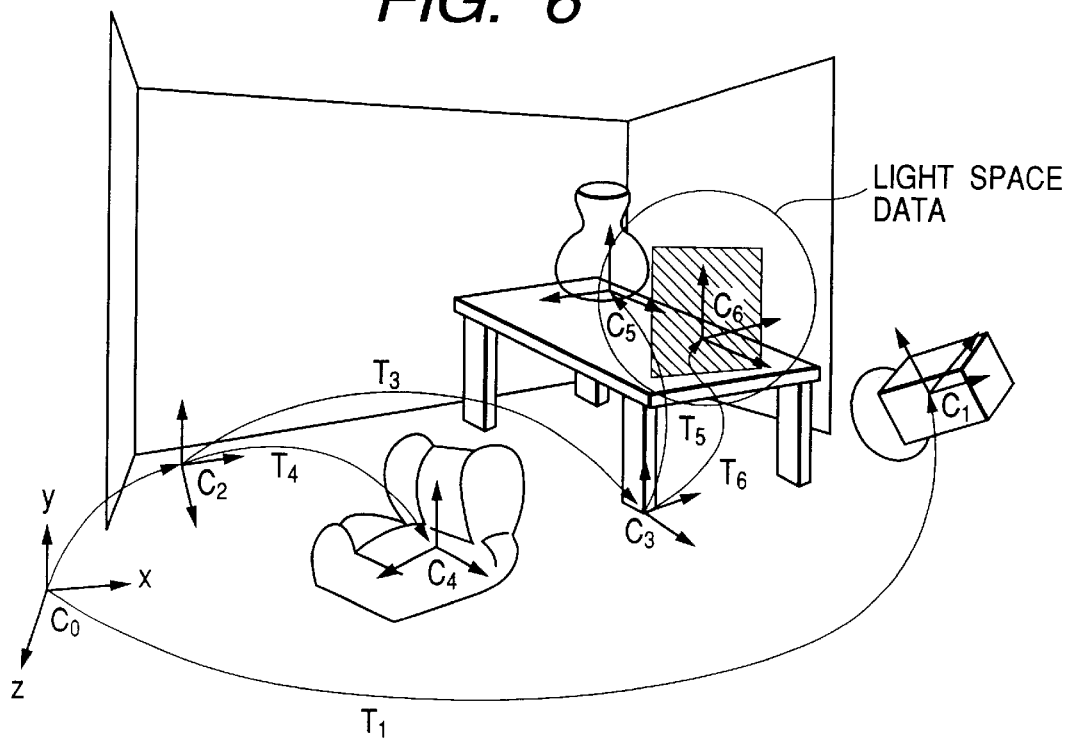
FIG. 6 shows an image of an example of a virtual environment to be generated by the first embodiment.
Figure 7:
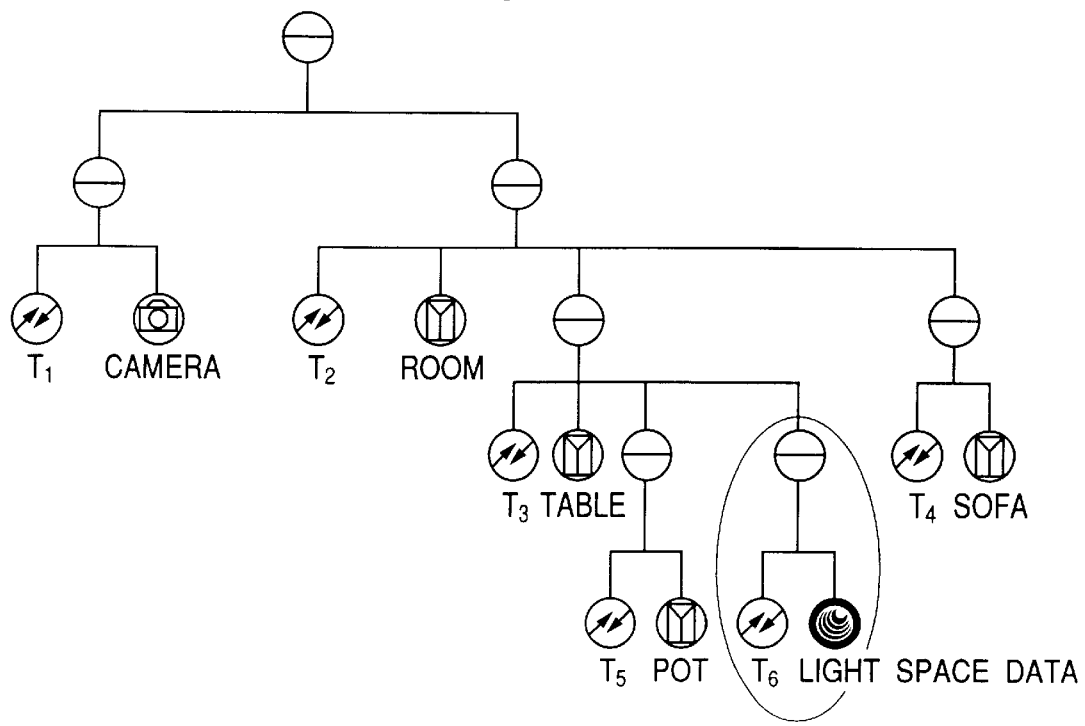
FIG. 7 shows a tree structure that expresses the virtual environment shown in FIG. 6.

FIG. 6 shows an image of an example of a simple virtual environment. In FIG. 6, paying attention to a room, table, and sofa in the space, the room is described on a coordinate system $C_2$, which is transformed from a world coordinate system $C_0$ by a coordinate transformation $T_2$, and the table and sofa in that room are respectively described on coordinate systems $C_3$ and $C_4$ which are transformed from the coordinate system $C_2$ by coordinate transformations $T_3$ and $T_4$. Unlike conventional method (1), tree structure data including shape data 3a, surface attribute data 3b, and light space data 3c is formed. In FIG. 6, light space data is arranged on the table. This data is described on a coordinate system $C_6$ which is transformed from the coordinate system $C_3$ by a coordinate transformation $T_6$. When the virtual environment shown in FIG. 6 is expressed by a tree structure, a tree shown in FIG. 7 is obtained.

Upon completion of the above processing, the flow advances to connector A. Connector A continues to the processing to be described below. In the processing after connector A, a series of processing operations are done when the virtual environment is presented to the operator, and is processed by the operator.

The processing after connector A will be described in detail below with reference to the flow chart in FIG. 3.

In order to allow the observer to observe the virtual environment, an image that can be seen when the virtual environment is viewed from that view point must be drawn on the display screen. In a basic method, by following all the nodes of the n-ary tree data shown in FIG. 7 by a left node & depth preferential search, data of all the nodes that constructs this tree are accessed. At this time, based on information written in each node, an image is sequentially drawn on the display screen at the time of access to the node.

In step S301, the observation display screen is initialized. In step S302, the position and direction 3e of the observation view point are initialized. The flow then advances to step S303 to start searching the tree structure. In this search, the left node & depth preferential search method is used, as described above (step S304). The node search continues until the end of search is determined (step S305).

If the contents of the found node indicate a coordinate transformation (step S306), the flow advances to step S307 to process the current coordinate transformation. If no node, the contents of which indicate a coordinate transformation, has been found so far, the found coordinate transformation is set as a current coordinate transformation as the fundamental coordinate transformation for a partial tree deeper than that node of the tree; otherwise, the existing current coordinate transformation is multiplied by the newly found coordinate transformation to update the current coordinate transformation, and the updated current coordinate transformation is set as a current coordinate transformation for a partial tree deeper than that node of the tree. Upon search in the depth direction of the tree, the current coordinate transformation is given to the next depth by passing the existing current coordinate transformation. If there are no more deeper nodes, and the search advances to a new shallower node, the current coordinate transformation which is to be updated by the next deeper node is not passed to the shallower node. In this case, the current coordinate transformation which was found by the previous search for the node of the tree at that depth is used.

If NO in step S306, the flow advances to step S308. If it is determined in step S308 that the contents of the node indicate a surface attribute, the flow advances to step S309 to process a current surface attribute. When this node appears, the surface attribute of the node is set to be a current surface attribute as the basic surface attribute of a partial tree deeper than that node. Upon search in the depth direction of the tree, the current surface attribute is given to the next depth by passing the existing current surface attribute. If there are no more deeper nodes, and the search advances to a new shallower node, the current surface attribute which is to be updated by the next deeper node is not passed to the shallower node. In this case, the current surface attribute which was found by the previous search for the node of the tree at that depth is used.

If NO in step S308, the flow advances to step S310. If it is determined in step S310 that the contents of the node indicate a geometric shape model, the flow advances to step S311 to draw a geometric shape model. In this processing, the coordinate transformation of the position, direction, and scaling of that shape model is done using the current coordinate transformation, and a display image is drawn on the display screen to be presented to the observer as a two-dimensional image by conventional method (1) using the current surface attribute. At this time, a depth value storage map corresponding to the individual pixels of the presentation display screen is prepared. Upon drawing a shape model in the drawing processing, the depth values of three-dimensional positions on the surface of the shape model at positions corresponding to the individual pixels on the display screen viewed from the view point position are written in the corresponding pixels in the depth value storage map. In this case, if the depth values have already been written in the depth value storage map by this processing, when a depth value obtained for drawing a new image is larger than the already stored depth value, the value is not written in this pixel on the presentation display screen and the depth value storage map is not rewritten.

If NO in step S310, the flow advances to step S312. If it is determined in step S312 that the contents of the node indicate light space data, the flow advances to step S313 to draw light space data. In this processing, the coordinate transformation of the position, direction, scaling, and the like of light space data is done using the current coordinate transformation. The position and direction, viewed from the reference plane of the light space data, of the view point position then are calculated. A drawing rule used for generating an image to be generated from the light space data under the observation conditions is determined on the basis of the calculation results and the like, and an image to be displayed on the presentation screen is generated. At this time, as in the drawing from a geometric shape model, depth discrimination in units of pixels on the display screen is performed. The distance between the view point position and the reference plane position of the light space data is used as the depth value of the light space data, and this value is compared with a corresponding depth value stored in the depth value storage map. If the value of the pixel of interest is smaller than the corresponding value in the depth value storage map, the value of the pixel of the image generated from the light space data is overwritten on the value in the map, thereby updating the depth value storage map. Otherwise, the map is not updated.

Upon completion of the processing in steps S307, S309, S311, and S313, the flow returns to step S304 as the beginning of the tree search.

If it is determined in step S305 that the tree search has ended, all the construction elements that construct the virtual environment have been searched once, and the first drawing of the virtual environment is complete.

After that, it is checked in step S314 if establishment of the view point position and direction 3e is to be changed. If the observer wants to walk through the virtual environment, he or she changes the view point position and direction 3e in this step. In the example shown in FIG. 6 or 7, the coordinate transformation $T_1$ is changed. When the view point position and direction 3e have changed, since the observation image of the virtual environment is to change, the flow returns to step S303 to generate a new observation image by redrawing. In other words, although the tree structure itself of the virtual environment remains the same, since the contents of the construction elements that construct the tree structure have changed, i.e., the tree that expresses the virtual environment has changed from that upon drawing in steps S303 to S313 above, the tree structure is searched again and redrawing is done.

The flow then advances to the processing for changing establishment of the observation display screen (step S315). For example, this processing broadens the field angle when the observer wants to look over a broader range of the virtual environment. That is, this processing is just like operation for changing, e.g., the zoom ratio upon photographing an actual real environment using a real camera. In the example shown in FIG. 6 or 7, the coordinate transformation $T_1$ is changed as in the above step. Note that the processing in step S315 may be skipped.

It is then checked in step S316 if the change processing of the virtual environment is to be done. Note that the change processing of the virtual environment is to add an object which is not currently present in the virtual environment, to delete an object in the virtual environment, or to replace an object in the virtual environment with another object which is not present in the virtual environment. If it is determined in step S316 that this processing is to be done, the flow advances to connector B; otherwise, the flow advances to step S317 to end the processing.

Figure 8:
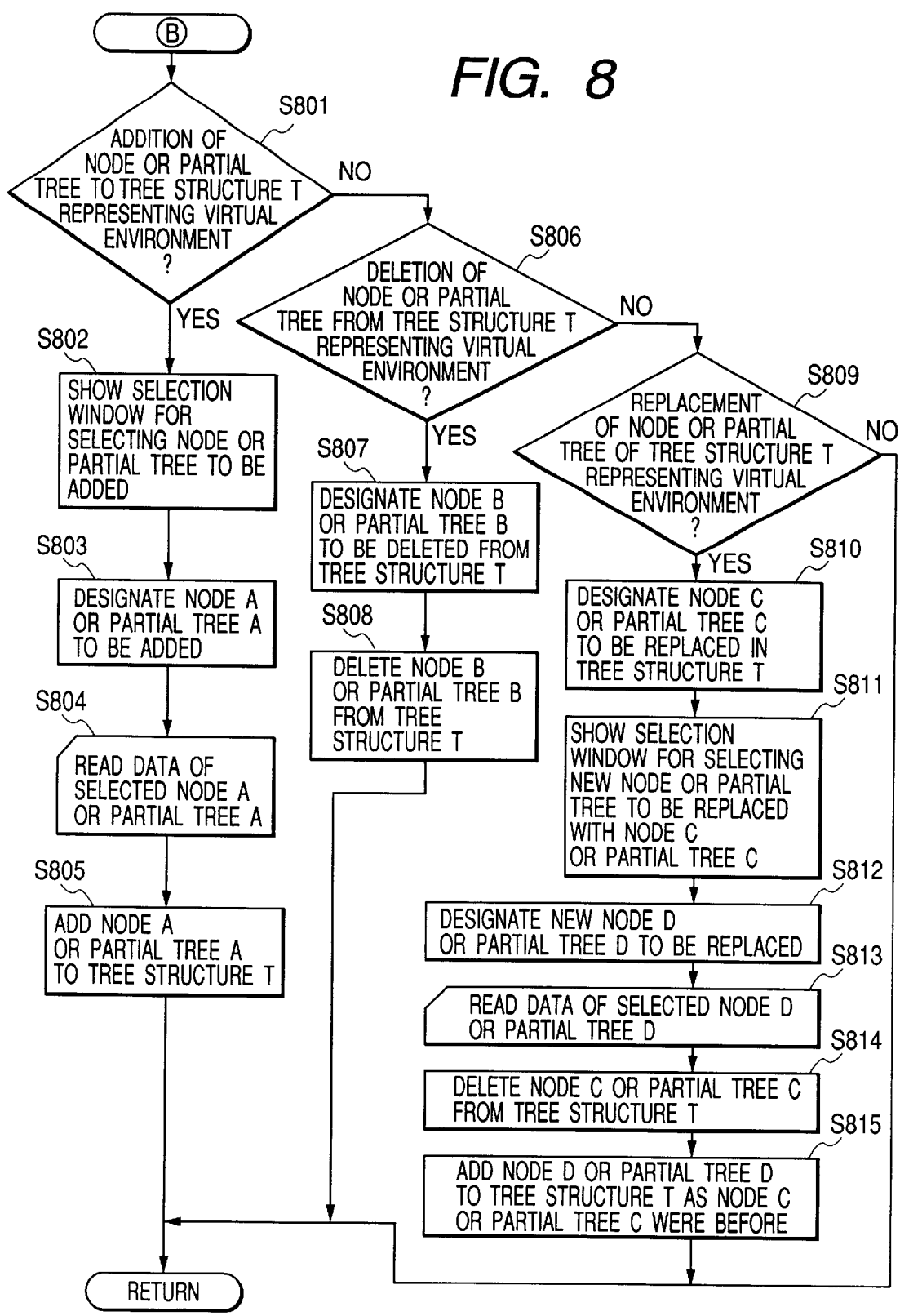
FIG. 8 is a flow chart showing addition, deletion, and replacement of tree structure elements of the first embodiment.

The change processing of the virtual environment to be done after connector B will be described in detail below with reference to the flow chart in FIG. 8. As described above, the change processing is to add, delete, or replace an object. The addition, deletion, replacement of an object in the virtual environment is achieved by changing the tree structure T itself that expresses the virtual environment.

It is checked in step S801 if an object is to be added to the virtual environment. Note that the "object" is one node as a construction element of the virtual environment or a combination of a plurality of nodes. If the object is a combination of a plurality of nodes, such nodes form a small tree to express the object, and such tree will be referred to as a "partial tree" to express the object in the first embodiment. For this reason, it is checked in step S801 if a node or partial tree that expresses an object is to be added to the tree structure of the virtual environment. If the node or partial tree is to be added, the flow advances to step S802; otherwise, the flow advances to step S806. A case will be explained first wherein the object is to be added.

In step S802, a selection window for making the operator select the object to be added to the virtual environment is presented on the window system 5 as the display device. Note that the objects that can be added are registered in advance, and are displayed as a list on that selection window. The operator selects and designates the object to be added from the selection window. The object to be selected is a node or partial tree, and node A or partial tree A is designated in this case (step S803). In this embodiment, the selection window is presented in step S802, and the operator selects the object from that window in step S803, thereby designating the object to be added. However, the present invention is not limited to such specific method. For example, objects may be assigned in advance to keys on the keyboard, and a desired object may be designated by pressing a key.

Figure 9:
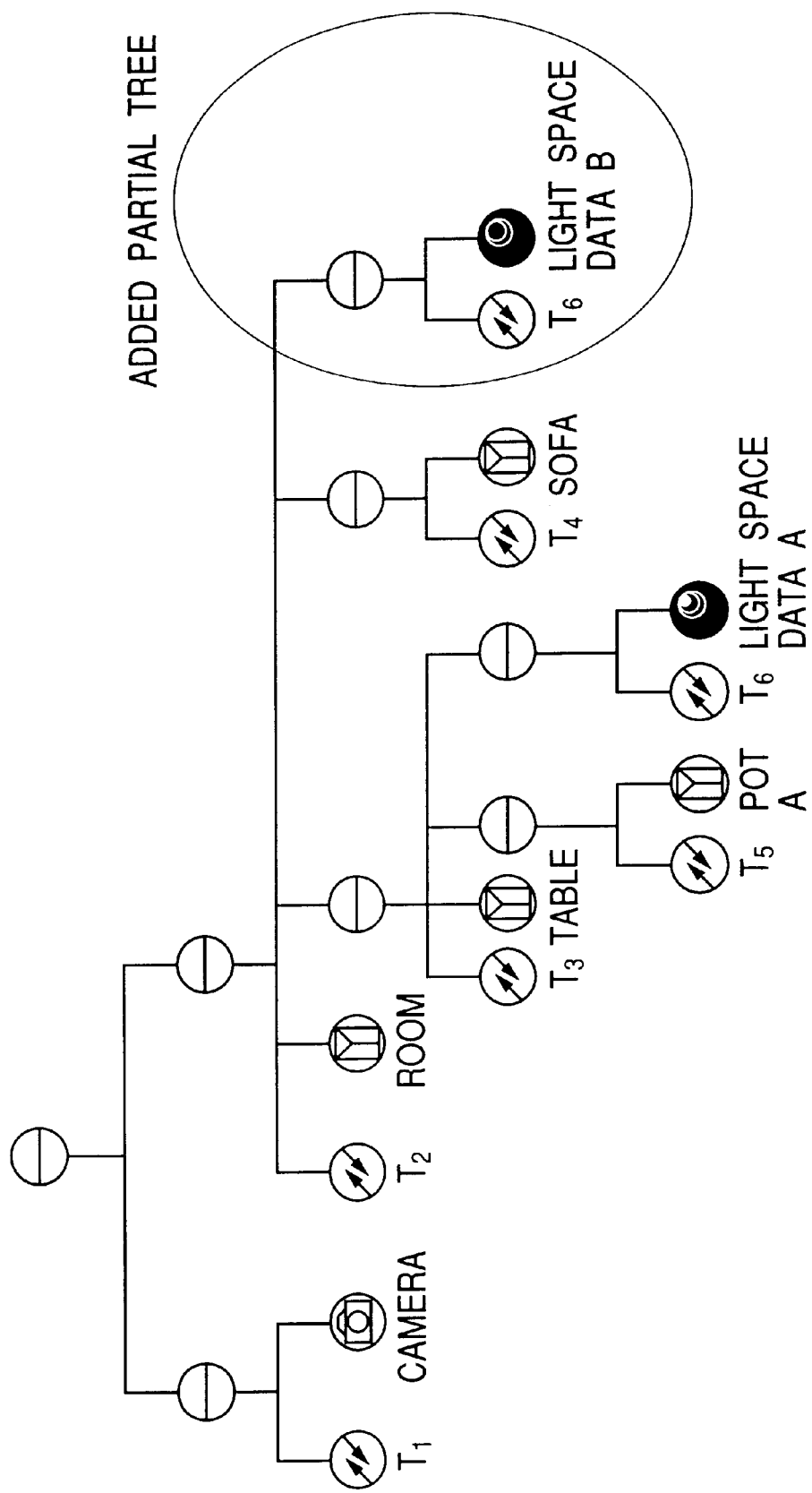
FIG. 9 shows an example wherein a partial tree is added to the tree structure of the virtual environment.

In step S804, the data of the designated object (node A or partial tree A) is read. This object may be shape data, light space data, or a combination thereof. In any case, the required data is read in this step. In step S805, the object (node A or partial tree A) read in step S804 is added to the tree structure T. Taking FIG. 7 above as an example, a new node or partial tree is added to the tree structure in FIG. 7, as shown in FIG. 9. In FIG. 9, a partial tree including light space data and coordinate transformation is added to the tree structure T.

Figure 3:
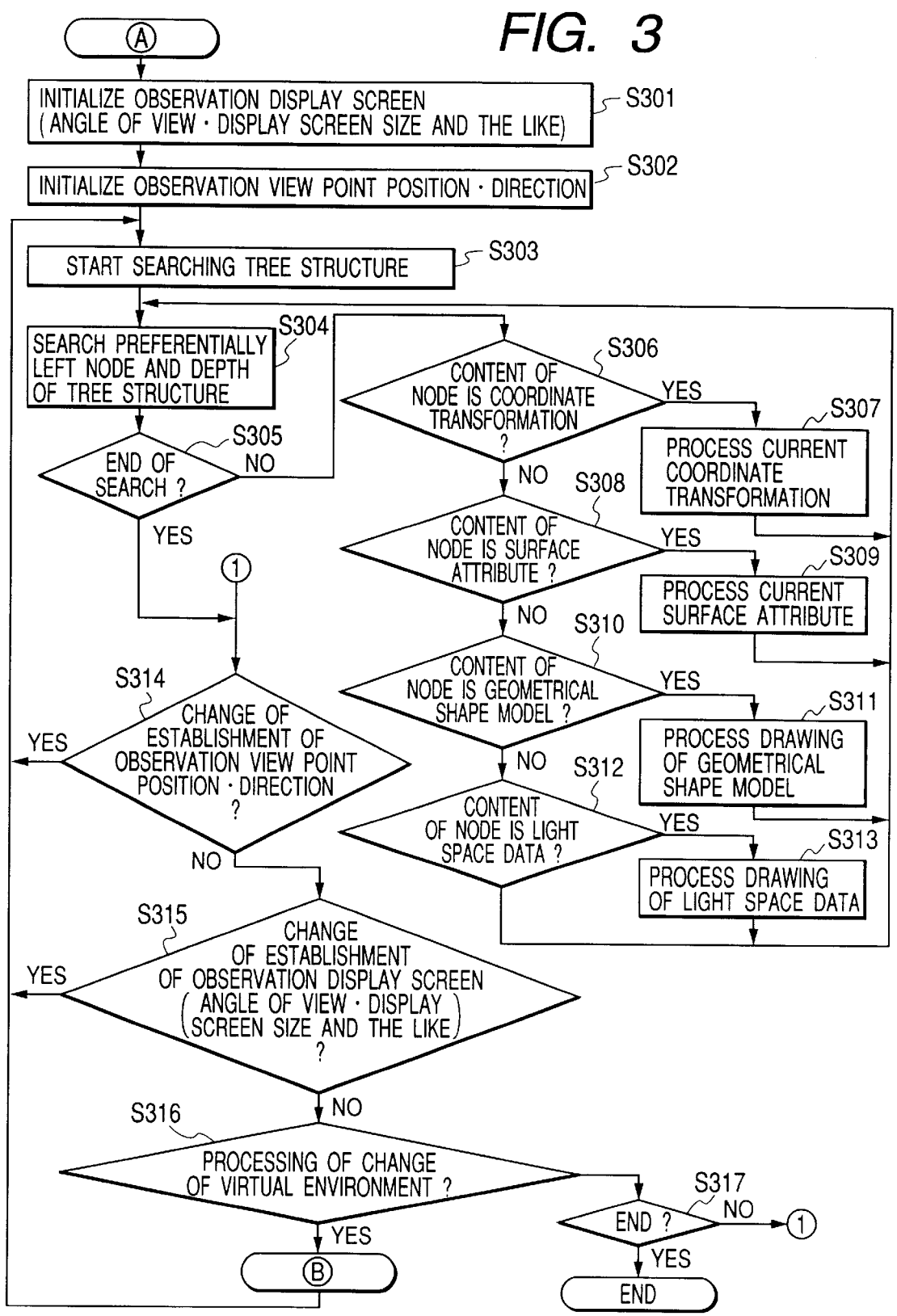
FIG. 3 is a flow chart showing the second half processing of the first embodiment.
Figure 4:
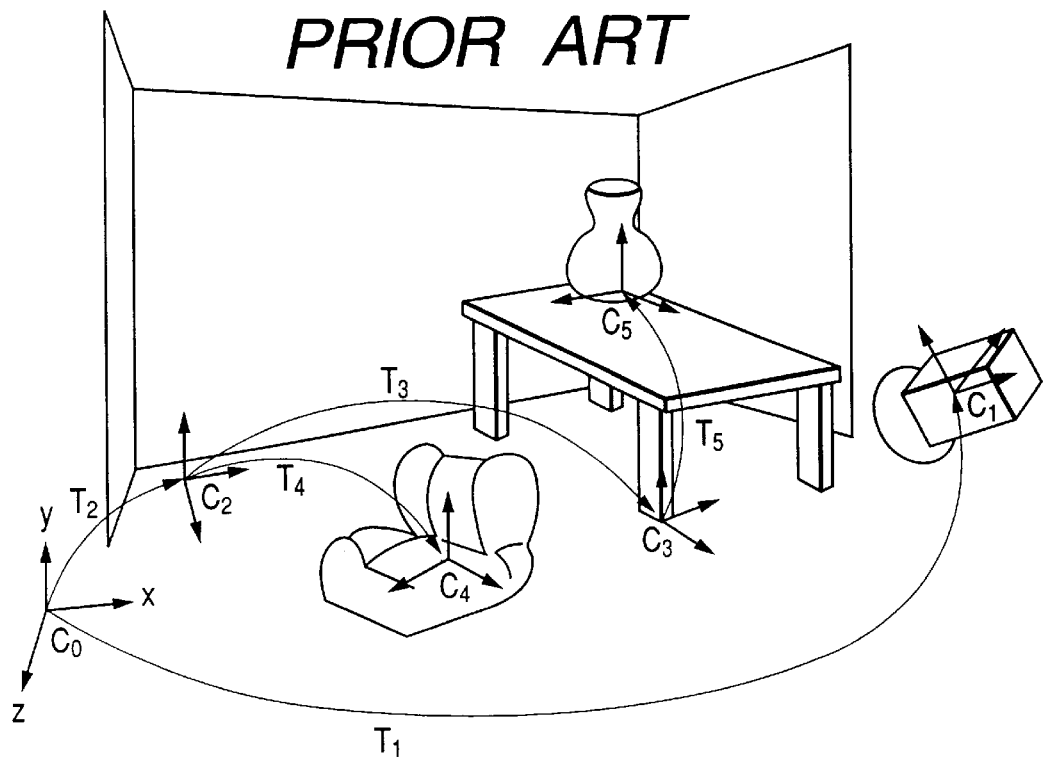
FIG. 4 shows an image of an example of a virtual environment based on conventional method (2)
Figure 5:
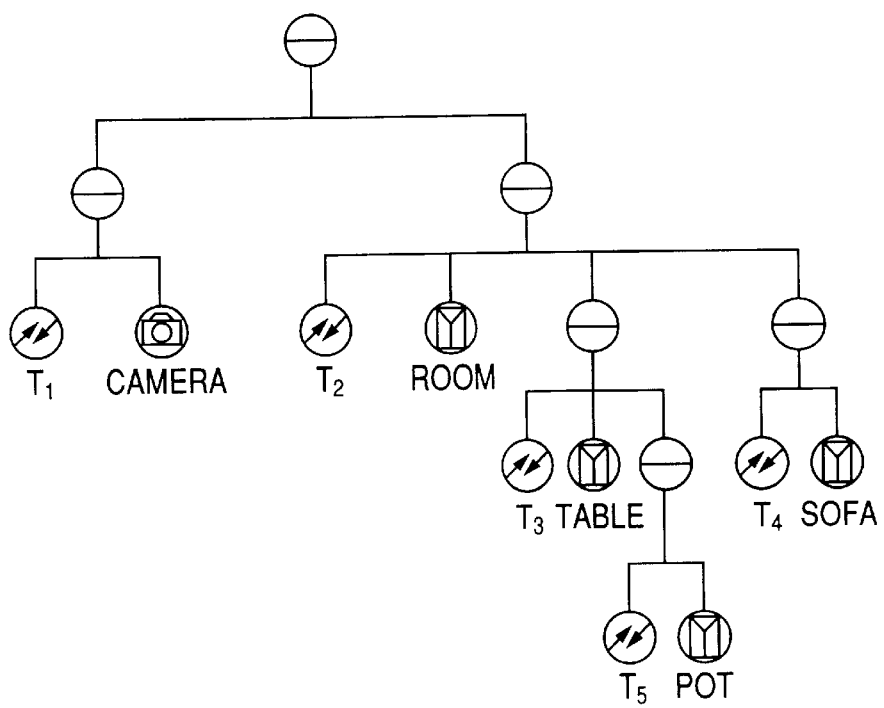
FIG. 5 shows a tree structure that expresses the virtual environment shown in FIG. 4.

Upon completion of the processing in steps S802 to S805, the flow returns to step S303 in FIG. 3. When the node or partial tree is added to the tree structure, since the tree structure itself of the virtual environment has changed, it becomes different from the tree structure obtained upon drawing in steps S303 to S313 above, and redrawing is done by searching the tree structure again.

Figure 10:
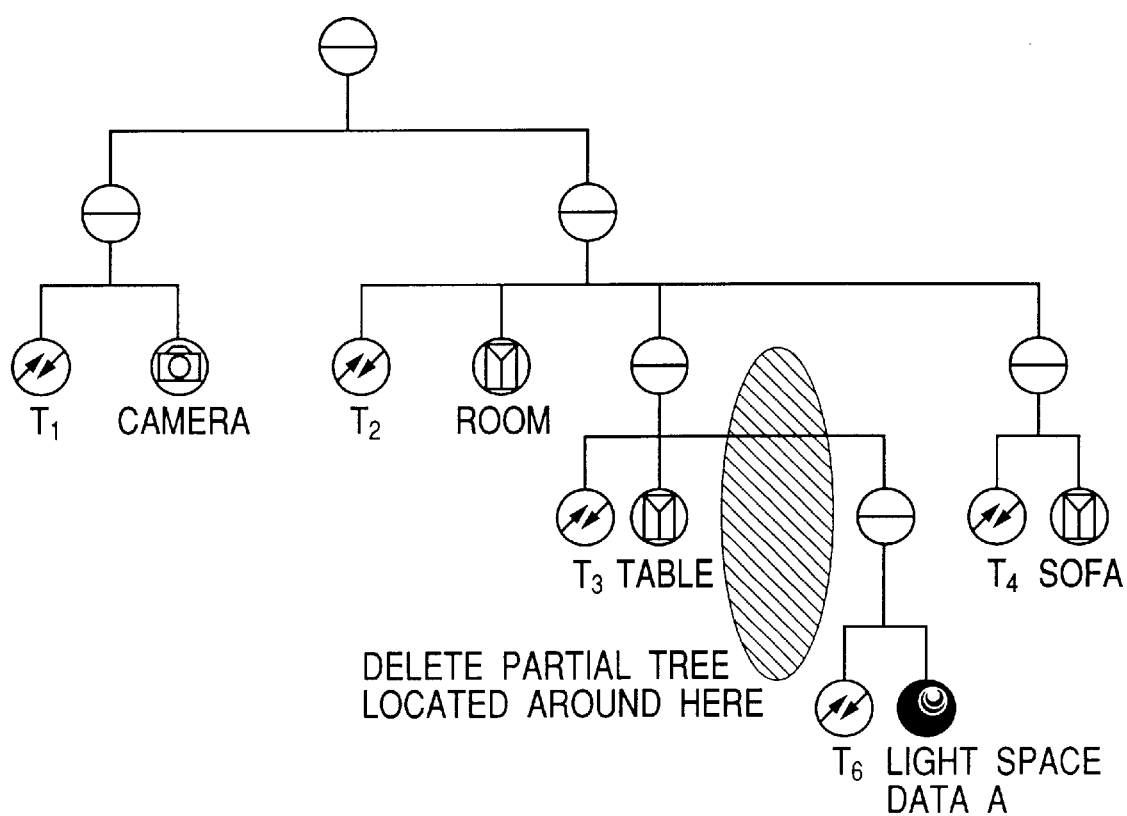
FIG. 10 shows an example wherein a partial tree is deleted from the tree structure of the virtual environment.

The processing executed when it is determined in step S801 that no object is added and the flow advances to step S806 will be described below. In step S806, it is checked if an object in the virtual environment is to be deleted. Since the "object" is a node or partial tree, it is checked in this step if the node or partial tree is deleted from the tree structure T of the virtual environment. If an object is to be deleted, the flow advances to step S807; otherwise, the flow advances to step S809. A case will be explained below wherein an object is to be deleted. In step S807, a node or partial tree, in this case, node B or partial tree B, that expresses the object to be deleted, is designated. In step S808, the designated node B or partial tree B is deleted from the tree structure T. Taking FIG. 7 above as an example, a node or partial tree of the tree structure in FIG. 7 is deleted, as shown in FIG. 10. In FIG. 10, a partial tree including shape data representing a pot and coordinate transformation is deleted from the tree structure T.

Upon completion of the processing in steps S807 and S808, the flow returns to step S303 in FIG. 3. When a node or partial tree is deleted from the tree structure, since the tree structure itself of the virtual environment changes, it becomes different from the tree structure obtained upon drawing in steps S303 to S313 above, and redrawing is done by searching the tree structure again.

If it is determined in step S806 that no object is deleted, the flow advances to step S809 to check if an object in the virtual environment is to be replaced. Since the "object" is a node or partial tree, it is checked in this step if a node or partial tree is replaced by another one in the tree structure T of the virtual environment. If it is determined that an object is to be replaced, the flow advances to step S810; otherwise, the flow returns to step S303 in FIG. 3.

If the object is to be replaced, a node or partial tree to be replaced, in this case, node C or partial tree C, is designated from the tree structure T that forms the virtual environment in step S810. In step S811, a selection window for making the operator select a new node or partial tree to be replaced by node C or partial tree C is presented on the window system 5 as the display device. A new node or partial tree, in this case, node D or partial tree D, is designated (step S812). In this embodiment, the selection window is presented in step S811, and the operator selects an object from that window in step S812, thereby designating a new object to be replaced. However, the present invention is not limited to such specific method. For example, objects may be assigned in advance to keys on the keyboard, and a desired object may be designated by pressing a key.

Figure 11:
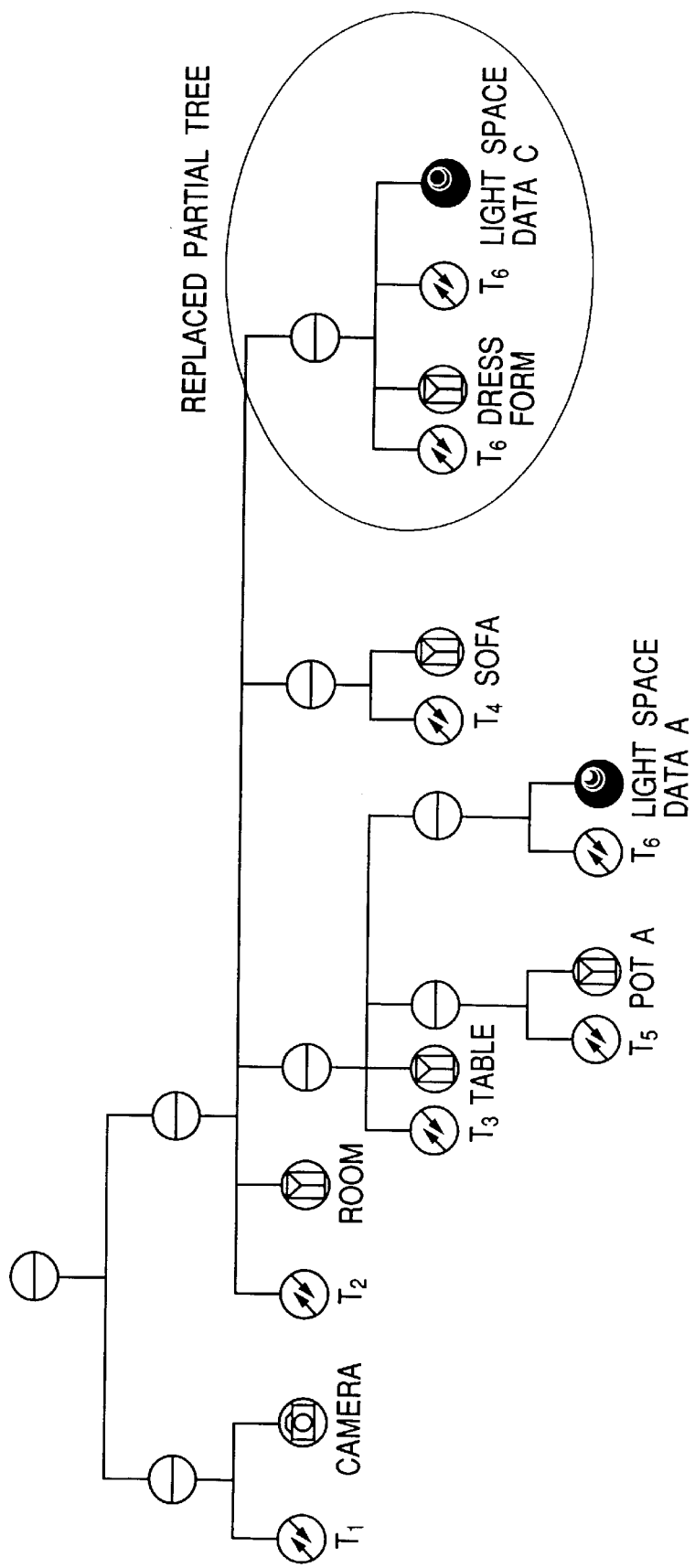
FIG. 11 shows an example wherein the tree structure of the virtual environment is replaced by another partial tree.

In step S813, data of the designated object (node C or partial tree C) is read. Node C or partial tree C designated in step S810 is deleted from the tree structure T in step S814, and node D or partial tree D designated in step S812 is added in step S815. At this time, by adding node D or partial tree D to the position from which node C or partial tree C is deleted, the same effect as replacement can be obtained. That is, replacement in steps S810 to S815 is a combination of addition and deletion. Taking FIG. 9 as an example, the node or partial tree in the tree structure in FIG. 9 is replaced by another new node or partial tree, as shown in FIG. 11. In FIG. 11, a partial tree including light space data and coordinate transformation is replaced by a partial tree including another light space data and coordinate transformation.

Upon completion of the processing in steps S801 to S815, the flow returns to step S303 in FIG. 3. When a node or partial tree is replaced by another one in the tree structure, since the tree structure itself of the virtual environment changes, it becomes different from the tree structure obtained upon drawing in steps S303 to S313 above, and redrawing is done by searching the tree structure again.

As described above, according to the first embodiment, since the above-mentioned change processing of the virtual environment can be executed for the tree structure including the shape data 3a, surface attribute data 3b, light space data 3c, and the like, the change processing of the virtual environment including various data can be done more efficiently.

Finally, FIGS. 19 to 22 show examples of images drawn on the display screen when a virtual environment is actually generated using the first embodiment and the operator observes it.

Figure 19:
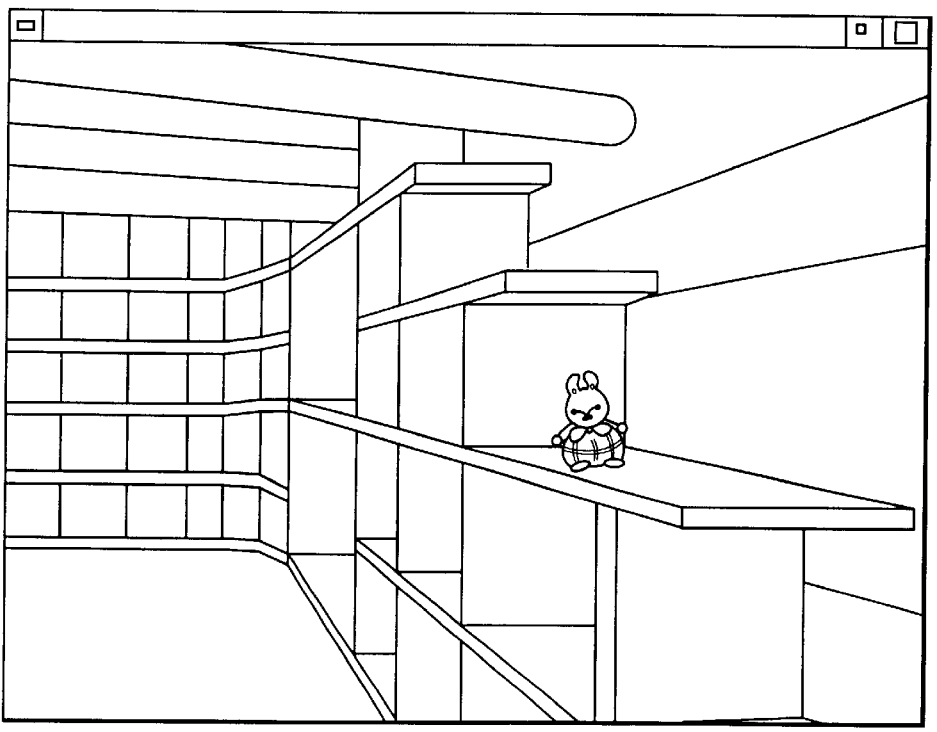
FIG. 19 shows an example of a drawn image during observation of a virtual environment at a certain view point in the first embodiment.
Figure 20:
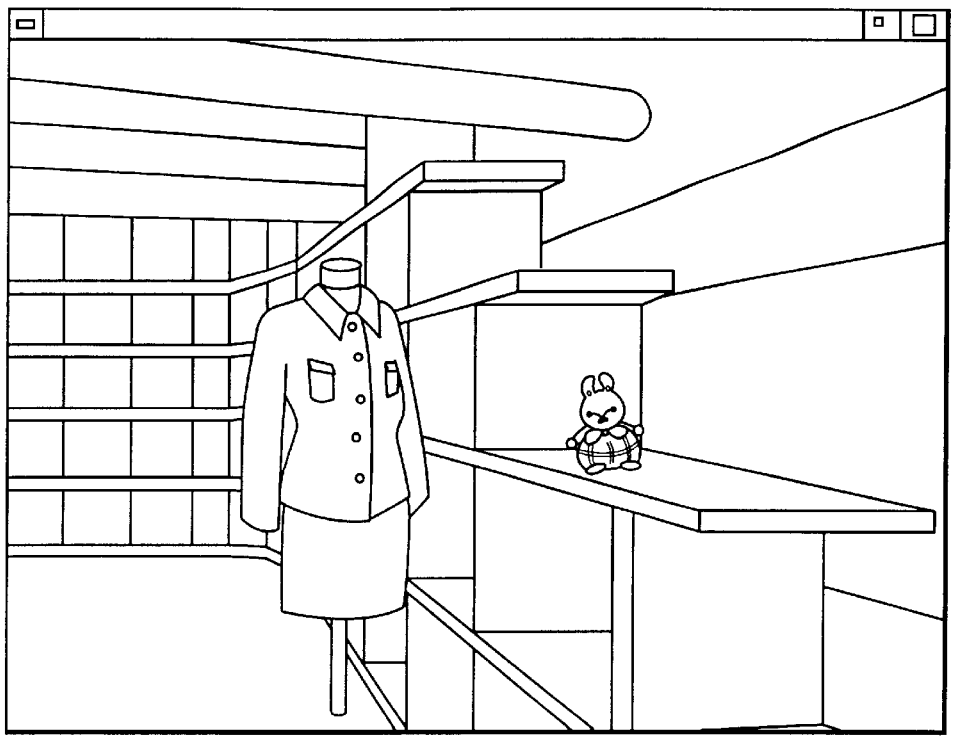
FIG. 20 shows an example of a drawn image obtained when an object is added to the virtual environment in FIG. 19.

FIG. 19 shows the state wherein the operator observes a certain virtual environment from a certain view point. When a node or partial tree is added to the tree structure of this virtual environment by the processing in steps S801 to S805, a new object can be added, and FIG. 20 shows an example of an image drawn on the display screen after the object is added. In FIG. 20, a dress expressed by light space data is added to the virtual environment.

Figure 21:
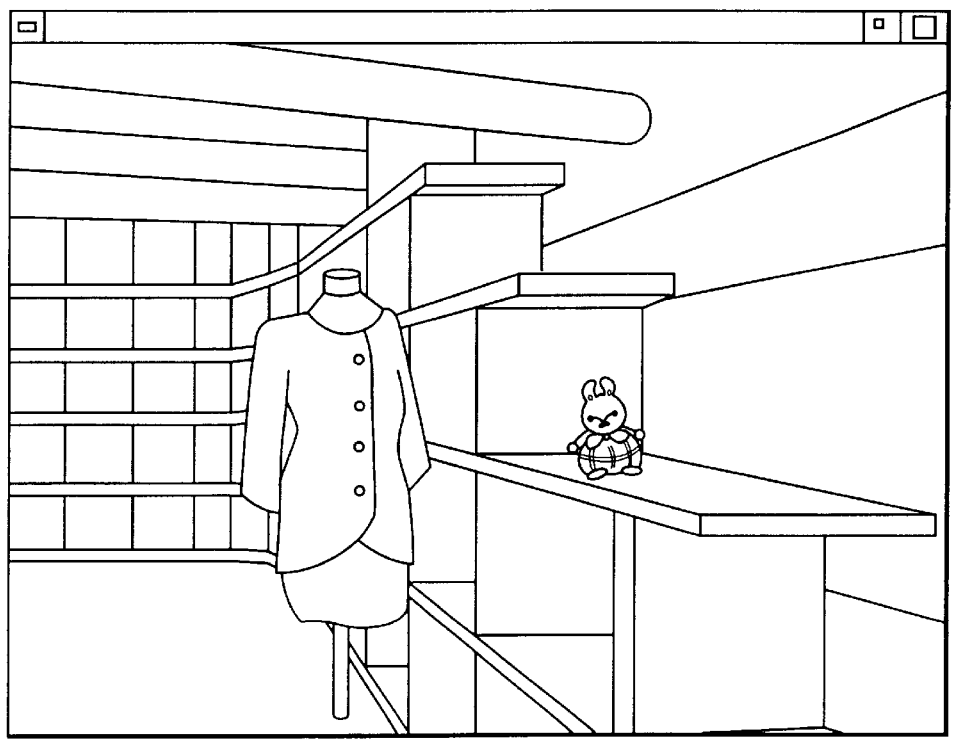
FIG. 21 shows an example of a drawn image obtained when an object in the virtual environment in FIG. 20 is replaced by another object.

FIG. 21 shows an example of an image drawn on the display screen after an object is replaced by the processing in steps S809 to S815 from the state shown in FIG. 20. In FIG. 21, a dress expressed by light space data is replaced by another dress expressed by another light space data.

Furthermore, when an object is deleted from the virtual environment shown in FIG. 21 by the processing in steps S806 to S808, the image drawn on the display screen is as shown in FIG. 19. In this example, the dress expressed by the light space data in FIG. 21 is deleted from the virtual environment.

Figure 22:
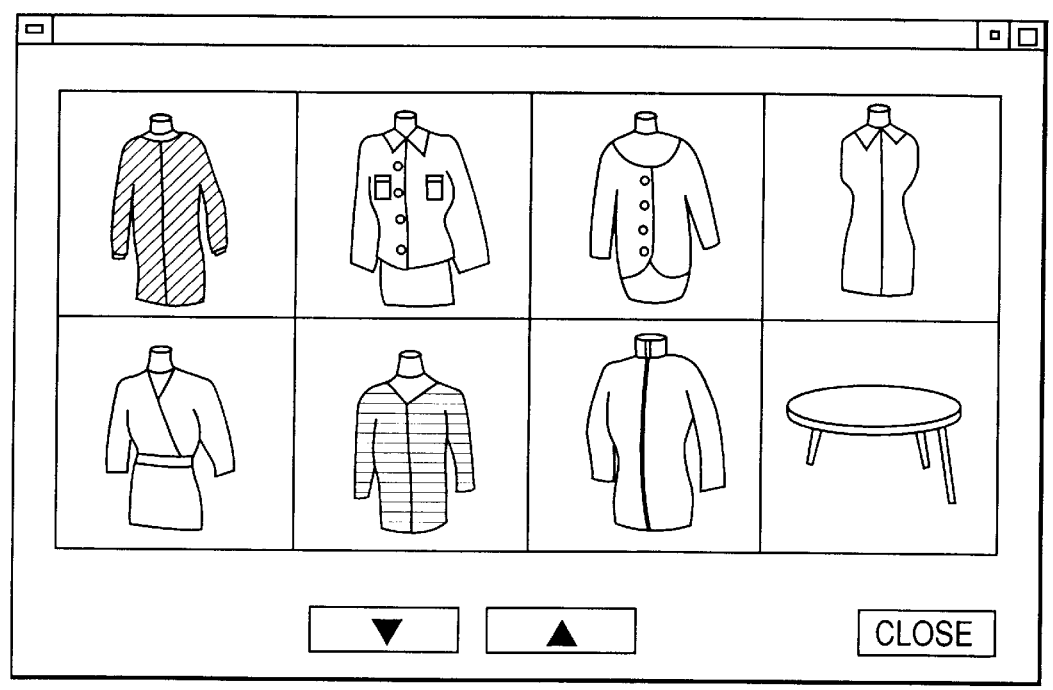
FIG. 22 shows a window that presents objects to be added to the operator upon adding an object to the virtual environment in FIG. 19.

FIG. 22 shows an example of the selection window for making the operator select an object to be added in the processing upon changing the state in FIG. 19 to that in FIG. 20. In the above-mentioned flow chart, the selection window is presented in step S802.

(b) Second Embodiment

In the first embodiment, a display image is generated from light space data. Alternatively, in the second embodiment, an image required for a display is generated from multi-view point images by the following method in place of light space data.

Figure 16:
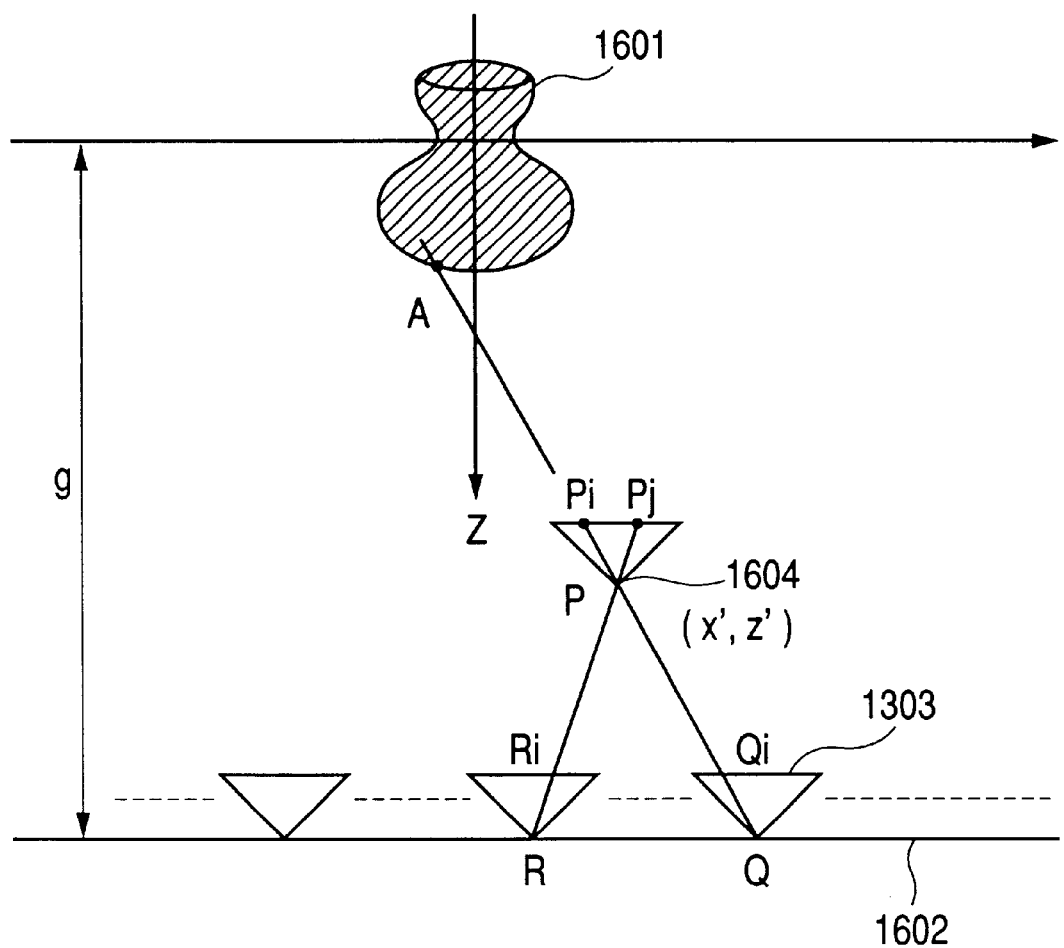
FIG. 16 is a view showing the principle of image generation from multi-view point images used in the second embodiment.

FIG. 16 shows the principle of reconstruction of an image from input multi-view point images. As shown in FIG. 16, in the second embodiment, images must be sensed by arranging cameras arranged along a line perpendicular to the photographing direction as the photographing conditions of multi-view point images. FIG. 16 illustrates an object 1601, a photographing view points arranging line 1602, which line connects the photographing positions of input images, a virtual CCD plane 1603 of a virtual camera, and a virtual camera 1604 set at the position (x', z') of the observer.

Figure 17:
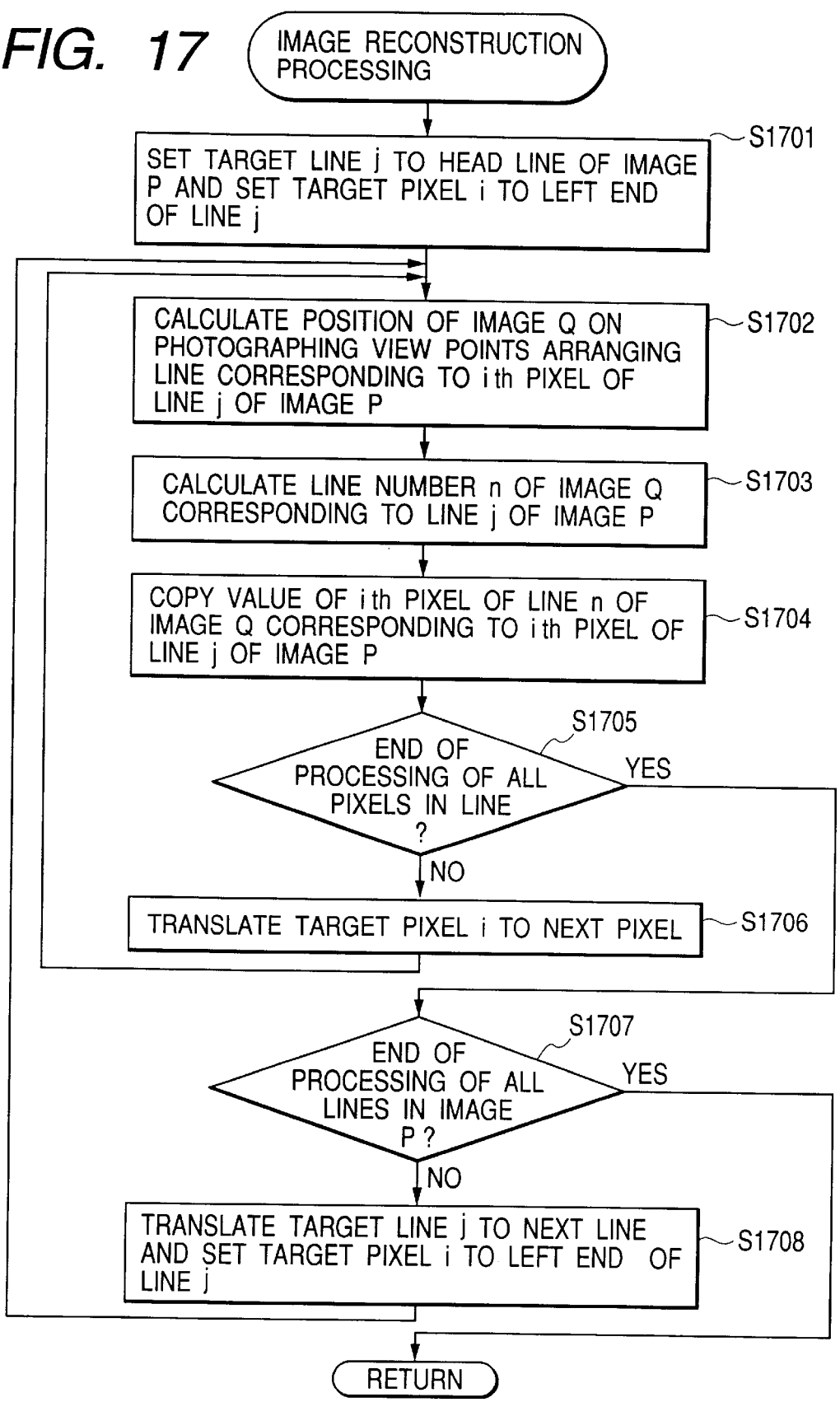
FIG. 17 is a flow chart showing image generation from multi-view point images used in the second embodiment.

The processing for generating an image from multi-view point images will be explained below with reference to the flow chart in FIG. 17. In step S1701, a target line j is set at the head line of an image P, and a target pixel i is set at the pixel at the left end of the line j.

In step S1702, the position of an image Q in the photographing view points arranging line 1602 corresponding to the i-th pixel of the line j of the image P is calculated.

This position can be calculated as follows.

Assume that a certain point A is imaged at a pixel position Pi of the virtual camera at the view point position P. Also, assume that Q represents the intersection between a line connecting the positions A and P, and the photographing view points arranging line 1602. At this time, as can be seen from FIG. 18, an object imaged at the pixel position Pi is equivalent to that imaged at a pixel position Qi of the image taken at the view point position Q. From the geometric limit condition in FIG. 16, the x-coordinate of the view point position Q can be expressed by equation (3) below. In this case, the central pixel position of the scan line is assumed to be the 0th pixel.

$$x = x' + I \cdot d \cdot (g-z')/f \quad (3)$$

where d is the pixel pitch of the virtual camera 1604, f is the focal length, and g is the distance from the origin to the photographing view points arranging line 1602.

Similarly, an object imaged at a pixel position Pj of the virtual camera at the view point position P is equivalent to that imaged at a pixel position Rj of an image at a view point position R stored in the data storage device 3.

With this method, for example, when an image is reconstructed by copying the i-th pixel value of the line j of the image Q to the i-th pixel of the line j of the image P, the reconstructed image is often distorted, i.e., the object in the image vertically stretches or shrinks.

In order to solve this problem, in step S1703, the line number n of the image Q corresponding to the line j of the image P is calculated after the processing in step S1702.

The method of calculating the line number n of the image Q will be described below with reference to FIG. 18.

Figure 18:
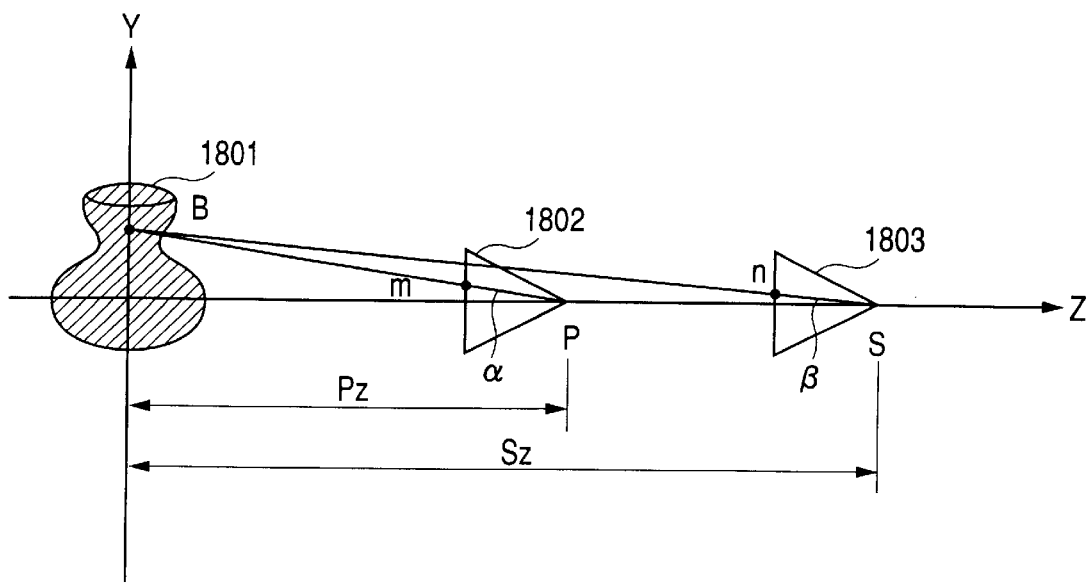
FIG. 18 is a view showing the principle of correction of vertical distortion in the image generation of the second embodiment.

FIG. 18 shows the principle of correcting distortion of the image reconstructed by the above-mentioned method. FIG. 18 illustrates an object 1801, an image 1802 to be reconstructed at the view point position P, and an image 1803 at the view point position S on the photographing view points arranging line 1602.

A given point B in the object 1801 will be examined. Assume that the point B is close to the y-axis, the z-coordinate value Pz of the image 1802 to be reconstructed at the view point position P and the z-coordinate value Sz of the image 1803 at the view point position S on the photographing view points arranging line 1602 are sufficiently large, or the z-coordinate value Pz of the image 1802 to be reconstructed at the view point position P is nearly equal to the z-coordinate value Sz of the image 1803 at the view point position S on the photographing view points arranging line 1602. At this time, light rays coming from the point B are recorded on a line m in the image 1802 to be reconstructed at the view point position P, and a line n in the image 1803 at the view point position S on the photographing view points arranging line 1602. If d represents the pixel pitches of the virtual CCD 1603, f represents the focal length of the virtual camera 1604, and N represents the number of lines of the virtual CCD 1603, we have:

$$Pz = \tan \alpha = Sz \cdot \tan \beta \quad (4)$$

$$\tan \alpha = d \cdot (N/2 - m)/f \quad (5)$$

$$\tan \beta = d \cdot (N/2 - n)/f \quad (6)$$

From equations (4), (5), and (6):

$$n = N/2 + (m - N/2) \cdot Sz/Pz \quad (7)$$

Accordingly, the value of the line m of the image 1802 to be reconstructed at the view point position P is equivalent to that of the line n, given by equation (7), of the image 1803 at the view point position S on the photographing view points arranging line 1602.

For this reason, after the processing in step S1703, the flow advances to step S1704, and the value of the i-th pixel of the line n of the image Q is copied to the i-th pixel of the line j of the image P. With this processing, image distortion upon reconstructing the image at the view point position, which is not on the photographing view points arranging line 1602 can be suppressed to some extent.

After this processing, the flow advances to step S1705 to check if processing for all the pixels in the target line j is complete. If YES in step S1705, the flow advances to step S1707; otherwise, the flow advances to step S1706. In step S1706, the target pixel i is moved to the right neighboring pixel, and the flow returns to step S1702.

In step S1707, it is checked if the processing for all the lines in the image P is complete. If YES in step S1707, this subroutine ends; otherwise, after the target line j is moved to the next line and the target pixel i is set at the left end of the line j in step S1708, the flow returns to step S1702.

In this manner, if multi-view point images taken at very small intervals on the photographing view points arranging line 1602 are obtained, the same processing based on the above-mentioned principle is repeated for all the scan lines, thereby reconstructing an image at the view point position which is not on the photographing view points arranging line 1602.

The present invention can be applied to either a system built by a plurality of devices or an apparatus consisting of a single device. Needless to say, the present invention can also be applied to a case wherein the invention is attained by supplying a program to the system or apparatus. In this case, a storage medium that stores the program according to the present invention constitutes the present invention. By loading the program from the storage medium to the system or apparatus, the system or apparatus operates in accordance with the predetermined method.

As described above, according to this embodiment, since a virtual environment including a plurality of different types of data is generated, and change processing of the generated virtual environment is done for a tree structure including different data, the change processing can be performed more efficiently for a virtual environment made up of various kinds of data.

What is claimed is:

1. An image processing method of generated and displaying a virtual environment, comprising:
    a tree structure generation step, of generating a tree structure which includes, as construction elements, a three-dimensional object and three-dimensional space, geometrically described by shape data and actual image data obtained by sensing an object by an image sensor and three-dimensional space;
    a virtual environments generating step, of generating a virtual environment including both the shape data and actual image data on a basis of the tree structure generated in the tree structure generation step;
    an instruction step, of instructing desired processing for a constructions element of the tree structure as a basis of the virtual environment generated in the virtual environment generation step;
    a change step, of changing the tree structure by the processing for the construction element instructed in the instruction step; and
    a registration step, of regenerating the virtual environment on a basis of change contents in the change step.

2. A method according to claim 1, wherein a surface attribute includes a reflection characteristic.

3. A method according to claim 1, wherein the desired processing instructed in the instruction step is addition of a construction element of the tree structure.

4. A method according to claim 1, wherein the desired processing instructed in the instruction step is deletion of a construction element of the tree structure.

5. A method according to claim 1, wherein the desired processing instructed in the instruction step is replacement of a construction element of the tree structure.

6. A method according to claim 1, wherein three-dimensional image data obtained based on two-dimensional multi-view point images is used in place of the actual image data.

7. An image processing apparatus for generating and displaying a virtual environment, comprising:
    tree structure generation means for generating a tree structure which includes, as construction elements, a three-dimensional object and three-dimensional space geometrically described by shape data, and actual image data obtained by sensing an object by an image sensor and three-dimensional space;
    virtual environment generation means for generating a virtual environment including both the shape data and actual image data on a basis of the tree structure generated by said tree structure generation means;
    instruction means for instructing desired processing for a construction element of the tree structure as a basis of the virtual environment generated by said virtual environment generation means;
    change means for changing the tree structure by the processing for the construction element instructed by said instruction means; and
    regeneration means for regenerating the virtual environment on a basis of change contents by said change means.

8. An apparatus according to claim 7, wherein a surface attribute includes a reflection characteristic.

9. An apparatus according to claim 7, wherein the desired processing instructed by said instruction means is addition of a construction element of the tree structure.

10. An apparatus according to claim 7, wherein the desired processing instructed by said instruction means is deletion of a construction element of the tree structure.

11. An apparatus according to claim 7, wherein the desired processing instructed by said instruction means is replacement of a construction element of the tree structure.

12. An apparatus according to claim 7, wherein three-dimensional image data obtained based on two-dimensional multi-view point images is used in place of the actual image data.

13. A storage medium that stores an image processing program including:
    a tree structure generation module for generating a tree structure which includes, as construction elements, a three-dimensional object and three-dimensional space, geometrically described by shape data, and actual image data obtained by sensing an object by an image sensor and three-dimensional space;
    a virtual environment generation module for generating a virtual environment including both the shape data and actual image data on a basis of the three structure generated by said tree structure generation module;
    an instruction module for instructing desired processing for a construction element of the tree structure as a basis of the virtual environment generated by said virtual environment generation module;
    a change module for changing the tree structure by the processing for the construction element instructed by said instruction module; and
    a regeneration module for regenerating the virtual environment on a basis of change contents by said change module.

14. A medium according to claim 13, wherein a surface attribute includes a reflection characteristic.

15. A medium according to claim 13, wherein the desired processing instructed by said instruction module is addition of a construction element of the tree structure.

16. A medium according to claim 13, wherein the desired processing instructed by said instruction module is deletion of a construction element of the tree structure.

17. A medium according to claim 13, wherein the desired processing instructed by said instruction module is replacement of a construction element of the tree structure.

18. A medium according to claim 13, wherein three-dimensional image data obtained based on two-dimensional multi-view point images is used in place of the actual image data.

* * * * *

UNITED STATES PATENT AND TRADEMARK OFFICE
CERTIFICATE OF CORRECTION

PATENT NO. : 6,400,362 B1
DATED : June 4, 2002
INVENTOR(S) : Shinji Uchiyama et al.

It is certified that error appears in the above-identified patent and that said Letters Patent is hereby corrected as shown below:

Title page,
Item [56], References Cited,
Insert -- FOREIGN PATENT DOCUMENTS,
    EP 0865001    9/1998 --.

Insert:    --OTHER PUBLICATIONS

"Collaborative Cyber Mirage: A Shared Cyberspace With Mixed Reality", S. Uchiyama et al., Proc. Int. Conf. on Virtual Systems and Multimedia VSMM '97 (CAT. No. 97TB100182), Geneva, Switzerland, 10-12 Sept. 1997, pages 9-18, XP002104966.

"Distributed Microscopy: towards a 3D Computer graphic-based Multi-User Microscope Manipulation, Imaging and Measurement System", A. Sulzmann et al., Sensor Fusion and Distributed Robotic Agents, Boston, MA, USA, 21-22 Nov. 1996, Vol. 2905, pages 183-192, XP00210597.

"Virtual Reality In Medicine-Computer Graphics and Interaction Techniques", M. Haubner et al., IEEE Transactions on Information Technology In BioMedicine, Vol. 1, No. 1, March 1997, pages 61-72, XP000720885.

"Dive-A Platform For Multi-User Virtual Environments", C. Carlson, et al., Computers and Graphics, Vol. 17, No. 6, 1 Nov. 1993, pp. 663-669 XP000546563.--.

Column 5,
Line 31, "and $\phi$" should read -- and $\psi$ --.

Column 13,
Line 22, "generated" should read -- generating --;
Line 35, "constructions" should read -- construction --;
Line 56, "multi-view point" should read -- multi-viewpoint --.

UNITED STATES PATENT AND TRADEMARK OFFICE
CERTIFICATE OF CORRECTION

PATENT NO. : 6,400,362 B1
DATED : June 4, 2002
INVENTOR(S) : Shinji Uchiyama et al.

It is certified that error appears in the above-identified patent and that said Letters Patent is hereby corrected as shown below:

<u>Column 14,</u>
Lines 27 and 64, "multi-view point" should read -- multi-viewpoint --;
Line 39, "three" should read -- tree --;

Signed and Sealed this

Twentieth Day of May, 2003

JAMES E. ROGAN
*Director of the United States Patent and Trademark Office*